Oct. 30, 1962 A. M. HEXDALL 3,060,870
HEAT STORAGE UNITS

Filed July 8, 1959 2 Sheets-Sheet 1

INVENTOR.
Andrew M. Hexdall,
BY Wolfe, Hubbard,
Voit & Osann
Attorneys.

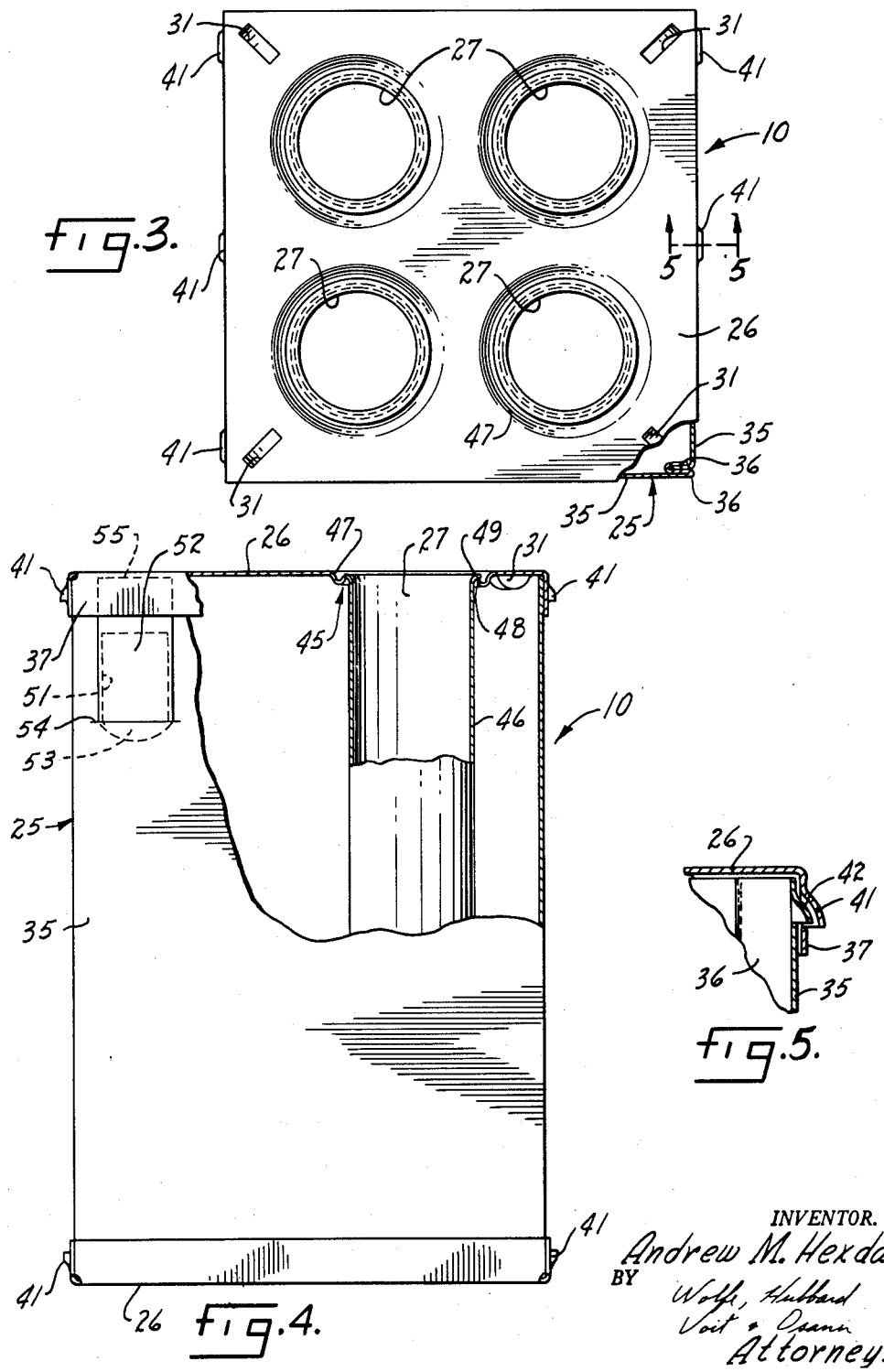

United States Patent Office 3,060,870
Patented Oct. 30, 1962

3,060,870
HEAT STORAGE UNITS
Andrew M. Hexdall, Morris, Ill.
Filed July 8, 1959, Ser. No. 825,849
4 Claims. (Cl. 110—97)

The present invention relates generally to furnace systems of the hot air type, and concerns more particularly a heat storage unit for increasing the efficiency of such systems.

In a hot air furnace system, the furnace combustion chamber is utilized to heat a current of air that is circulated into the space to be heated. A thermostatic control is usually provided to interrupt operation of the furnace when the desired temperature has been reached.

As a result of the ON, OFF interrupted operation of the furnace, heat is provided in intermittent surges of hot air, rather than as a relatively constant stream of warm air, and thus the furnace works inefficiently and the heated space is subject to regular temperature fluctuations.

To partially correct the ON, OFF type of operation inherent in a hot air heating system, it has been proposed to provide means for temporarily "storing" heat in the hot air circulatory system when the furnace is ON so that when the furnace "cuts off," the stored heat can be gradually supplied to the circulating air. This results in a more continuous and uniform heat supply being available to warm the desired space.

A particularly effective heat storage device for this purpose is disclosed in applicant's U.S. Patent No. 2,858,781, issued November 4, 1958, but it has been found that a need exists for devices suited for installation in heating systems which are physically too small for efficiently using the patented devices.

Accordingly, it is the primary aim of the invention to provide a novel heat storage unit having a high heat storage capacity and a large heat transfer area while being compact and of small over-all dimensions.

It is also an object of the invention to provide a novel heat storage unit which is readily adaptable to a variety of installations. With more particularity, it is an object to provide a heat storage assembly made up of independent units of the above type that can be easily grouped into any arrangement called for by a particular furnace system installation.

Moreover, it is an object to provide a heat storage unit as characterized above that is economical to manufacture. It is a related object to provide such a unit that can be stored and shipped "knocked down" and assembled quickly and easily without special tools or equipment.

Other objects and advantages of the invention will become apparent upon reading the following detailed description and upon reference to the drawings in which:

FIG. 3 is a plan view of one of the units shown in FIG. 1 with a portion of the unit being broken away;

FIG. 4 is an elevation of the unit shown in FIG. 3 partially broken away to illustrate the interior construction; and FIG. 5 is a fragmentary section taken approximately on the line 5—5 of FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
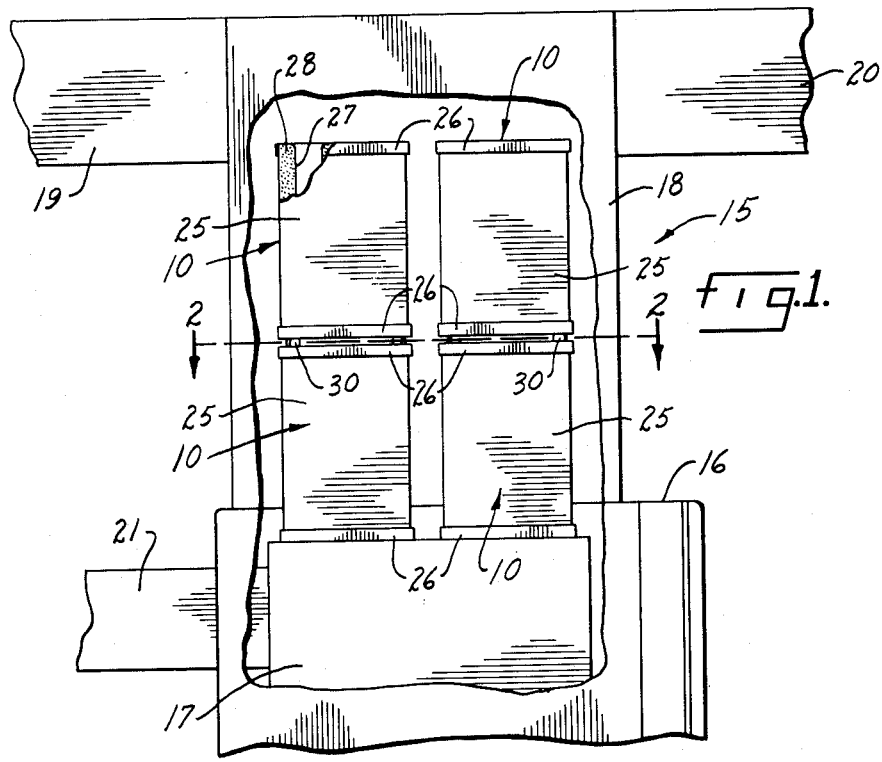
FIGURE 1 is a fragmentary elevation, partially in section, of a furnace system including heat storage units embodying the present invention.
Figure 2:
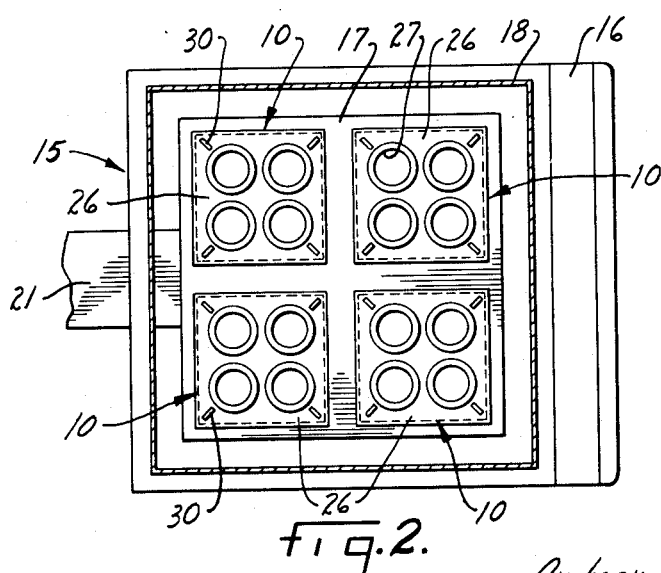
FIG. 2 is a fragmentary section taken along the line 2—2 of FIG. 1.

Turning now to FIGS. 1 and 2, there is shown an arrangement of heat storage units 10 embodying the invention installed in a typical hot air furnace system 15. The illustrated furnace system 15 includes a furnace 16 having a combustion chamber 17 that underlies a warm air plenum 18 within which the units 10 are positioned. Heating ducts 19 and 20 extend from the plenum 18 to the space to be heated by the furnace system. A combustion exhaust pipe 21 carries the combustion products from the chamber 17.

In the exemplary arrangement illustrated, the warm air plenum 18 contains eitght heat storage units 10, with there being four groups of two units stacked together and resting on the combustion chamber 17. All of the units 10 are identical and can be assembled much in the manner of building blocks in any arrangement and in any number, in accordance with the shape and size of the plenum within which they are to be used.

Pursuant to the invention, each of the units 10 is formed of four side panels defining a rectangular tube 25 and two end panels 26 closing the ends of the tube, with the units having longitudinally extending passages 27 therethrough. Preferably, the side and end panels are formed from easily worked sheet metal and the unit is filled with a heat absorbing material such as sand 28.

When the units 10 are stacked, the passages 27 are in axial alinement so that heated air may move freely up through the passages as well as around the sides of the units.

In order to stack the heat storage units 10, a plurality of slugs 30 are interposed between the units with the slugs being received in recesses in the units so as to vertically space the units and lock them against relative movement. In the preferred construction, the slugs 30 take the form of disks or washers and the end panels 26 are formed with semi-cylindrical recesses 31 at each corner. When the units are stacked, the washers 30 are rested in the recesses 31 formed in the top end panel 26 of the bottom unit 10. Another one of the units 10 is then lowered onto the upstanding slugs 30 so that the slugs are received within the recesses 31 formed in the bottom end panel 26 of the upper unit. With the slugs 30 fitted into the opposed sets of recesses, the stacked units 10 are locked securely against relative shifting movement and are also spaced apart so as to permit free air flow between them.

It can thus be seen that in a stacked arrangement of units 10 such as is shown in FIGS. 1 and 2, the vertical spacing of the stacked units and the alined passages 27 expose a large surface area for transferring heat from the surrounding air to the sand 28 contained by the units. The units thus quickly absorb heat generated by the furnace combustion chamber 17 and readily discharge that heat to the circulating air when the furnace shuts off. The mass of sand contained by each of the units 10 gives the assembled units a very high heat absorption capacity.

Further in accordance with the invention, the units 10 are constructed so as to be economical to manufacture and easy to assemble. To this end, the rectangular tube 25 is formed from four side panels 35 having interlocking folded portions 36 along opposite edges so that the folded portions can be readily slid together. Also, the end panels 26 are formed with turned flanges 37 along each edge which overlie the side panels so as to prevent the interlocking folded portions 36 of the side panels from separating.

At least two of the side panels, and the flanges 37 overlying them, have interfitting ribs punched thereinto for locking the end panels on the rectangular tube 25 formed by the side panels. In the illustrated embodiment, three ribs 41 are pressed outwardly in each of two opposed flanges 37 on the end panels 26. Corresponding ribs 42 are pressed outwardly along the top edges of the underlying side panels 35 (see FIG. 5). To lock the end panels 26 into place, they are simply pressed downwardly onto the rectangular tube formed by the side panels until the ribs 41 on the flanges 37 snap over the ribs 42 on the side panels 35.

In order to economically and easily form the passages 27, the end panels 26 have alined circular openings 45 with inwardly tapering, outwardly curled edges, and cylindrical tubes 46 are fitted into the alined openings with the tube ends being peened over the curled edges of the openings. In the preferred construction, the end panels 26 are pressed so that the portions of the panels surrounding the openings 45 are inwardly tapered at 47 and are curled outwardly to define a curled edge 48 about each of the openings. The inward taper 47 about each of the openings 45 disposes the edges 48 beneath the plane of the outer face of the end panels 46. Thus, when an end panel 26 is placed with its outer face on a flat surface such as a workroom floor, the tubes 46 can be inserted through the openings 45 so as to rest on the floor and the engagement of the edges 48, spaced from the flat surface, will prevent displacement of the tubes as they are locked into place.

The outwardly curled edges 48 surrounding each of the openings 45 also permits the tubes 46 to be securely locked in place by peening the tube ends 49 over the relatively sharp, outwardly facing edges 48 of the openings. Each of the tubes 46 is similarly connected to each of the end panels 26. It will thus be clear to those skilled in the art that assembly of the units 10 is quite a simple and rapid operation.

To fill the units 10 with sand once they are assembled, an opening 51 is provided at one end of one of the side panels 35. The opening 51 permits sand to be easily funneled or channeled into the assembled unit 10. In the preferred construction, once the unit 10 is filled with sand, the opening 51 is closed by a plate 52 having one end 53 inserted into slits 54 at the bottom of the opening 51 and the other end 55 disposed behind the overlying flange 37 of the adjacent top panel 26. The plate 52 is thus securely held in position over the opening 51.

It can now be appreciated that the heat storage units 10 can be quite economically manufactured since their component parts may be simply formed from sheet metal using conventional procedures. The units can be shipped in "knocked down," disassembled condition so as to make a compact, easily handled package, and the user or installer of the units may quickly and easily assemble them without special jigs or tools.

It can also be seen that the units 10 permit a great deal of flexibility in installation since each unit is relatively compact and can be assembled with other units in adjacent or stacked relationship to provide a high heat absorbing capacity for furnace systems having warm air plenums of various sizes and shapes.

I claim as my invention:

1. A heat storage unit for use in a hot air furnace system comprising, in combination, side panels defining a tube, top and bottom panels disposed on each end of said tube and having flanges overlying said side panels, at least two of said side panels and the flanges overlying them having interfitting ribs formed therein for locking the top and bottom panels on said tube, said top and bottom panels having alined, circular openings with inwardly tapered, outwardly curled edges, and a cylindrical tube fitted into said alined openings with its opposite ends having portions bent over the curled edges of said openings so as to lock the tube in place.

2. A heat storage unit for use in a hot air furnace system comprising, in combination, four side panels defining a rectangular tube, square top and bottom panels disposed on each end of said tube and having flanges overlying said side panels, at least two of said side panels and the flanges overlying them having interfitting ribs punched thereinto for locking the top and bottom panels on said tube, said top and bottom panels each having a plurality of alined, circular openings with inwardly tapered, outwardly curled edges, cylindrical tubes fitted into said alined openings with their opposite ends having portions bent over the curled edges of said openings so as to lock the tubes in place, and said unit being filled with a heat absorbing material.

3. A heat storage unit for use in a hot air furnace system comprising, in combination, four sheet metal side panels locked together at their edges so as to define a rectangular tube, square top and bottom sheet metal panels disposed on each end of said tube and having turned edge flanges overlying said side panels, at least two of said side panels and the flanges overlying them having interfitting ribs punched thereinto for locking the top and bottom panels on said tube, said top and bottom panels having alined, circular openings with inwardly tapered, outwardly curled edges, and a sheet metal, cylindrical tube fitted into said alined openings with its opposite ends having portions peened over the curled edges of said openings so as to lock the tube in place.

4. For use in the warm air plenum of a hot air furnace system, the combination comprising, a plurality of heat storage units disposed in vertically stacked relation, each of said units having side panels defining a tube and end panels closing the opposite ends of said tube, said units also having longitudinally extending passages therethrough with the passages in the stacked devices being in axial alinement, and a plurality of slugs interposed between the stacked units with the slugs being received in recesses formed in said units so as to vertically space the units and lock them against relative movement.

References Cited in the file of this patent

UNITED STATES PATENTS

| 1,016,565 | Huenefeld | Feb. 6, 1912 |
| 1,080,368 | Reagan | Dec. 2, 1913 |
| 1,239,223 | Ross | Sept. 14, 1917 |
| 1,370,722 | Adam | Mar. 8, 1921 |
| 2,298,857 | Clark | Oct. 13, 1942 |
| 2,409,279 | Hiller | Oct. 15, 1946 |
| 2,511,876 | Protzeller | June 20, 1950 |
| 2,601,167 | Navarro | June 17, 1952 |
| 2,677,664 | Telkes | May 4, 1954 |
| 2,833,532 | Ries | May 6, 1958 |
| 2,858,781 | Hexdall | Nov. 4, 1958 |